United States Patent [19]

Alkire et al.

[11] Patent Number: 5,020,234

[45] Date of Patent: Jun. 4, 1991

[54] PROBER FOR TESTING GENERATOR STATOR WEDGE TIGHTNESS WITH ROTOR IN PLACE

[75] Inventors: Gerald R. Alkire, Winter Springs, Fla.; George F. Dailey, Plum Borough; Mark W. Fischer, Pittsburgh, both of Pa.

[73] Assignee: Westinghouse Electric Corp., Pittsburgh, Pa.

[21] Appl. No.: 403,419

[22] Filed: Sep. 1, 1989

[51] Int. Cl.⁵ .......................... G01B 7/14; G01B 21/16
[52] U.S. Cl. ............................................ 33/656; 33/502; 33/558; 324/207.18; 358/100; 73/865.8
[58] Field of Search .................. 73/572, 865.8, 866.5, 73/865.9, 12; 358/100, 106, 107, 108; 324/158 MG, 551, 545, 207.18; 340/870.36; 33/502, 556, 558, 588.01-558.9, 558.1, 14 558.5, 559, 561, 542, 655, 656

[56] References Cited

U.S. PATENT DOCUMENTS

| | | | |
|---|---|---|---|
| 1,108,697 | 8/1914 | Cash | 33/556 |
| 3,845,561 | 11/1974 | Elsdoerfer | 33/556 |
| 4,422,320 | 12/1983 | Moorby et al. | 73/12 |
| 4,502,329 | 3/1985 | Fukunaga et al. | 73/573 |
| 4,534,206 | 8/1985 | Kiso et al. | 73/12 |
| 4,676,665 | 6/1987 | Twerdochlib | 374/6 X |
| 4,803,563 | 2/1989 | Dailey et al. | 358/100 |
| 4,811,091 | 3/1989 | Morrison et al. | 358/100 |
| 4,889,000 | 12/1989 | Jaafar et al. | 73/865.8 |

FOREIGN PATENT DOCUMENTS

| | | | |
|---|---|---|---|
| 1101811 | 3/1961 | Fed. Rep. of Germany | 73/865.9 |
| 248187 | 7/1987 | German Democratic Rep. | 73/572 |
| 1042049 | 9/1983 | U.S.S.R. | 73/865.9 |

*Primary Examiner*—Tom Noland

[57] ABSTRACT

Apparatus for measuring ripple spring deflection to determine stator wedge tightness in an electric generator without removing the rotor includes a low profile carriage insertable in the gap between the rotor and stator. A probe is aligned longitudinally and laterally with holes in the stator wedges with the aid of a miniature television camera on the carriage and extended through an aligned hole to contact the ripple spring. The probe is connected through a cable to the core of a linear variable differential transformer mounted on the carriage which provides an accurate measurement of probe extension. The probe is extended and retracted by an arrangement of cables and springs providing a lost motion coupling which accommodates for seating of the probe against a ripple spring at less than full extension.

22 Claims, 8 Drawing Sheets

PROBER FOR TESTING GENERATOR STATOR WEDGE TIGHTNESS WITH ROTOR IN PLACE

BACKGROUND OF THE INVENTION

1. Field of the Invention

This invention relates to remotely controlled apparatus insertable in the narrow gap between the rotor and stator in an electric power generator to measure the tightness of stator wedges held in place by ripple springs. More particularly, it relates to such apparatus which includes a non-conductive, non-magnetic probe mounted on a low profile carriage and extendable through holes in selected stator wedges to measure the deflection of the ripple springs.

2. Background Information

The stator coils in a large electric generator are retained in slots in the stator by stator wedges. Ripple springs inserted between the wedges and the coils maintain a positive load on the coils for slot tightness. It is very important that stator wedge tightness be maintained. Failure to maintain proper tightness can lead to stator coil insulation failure due to vibration caused by mechanical and magnetic loading.

In accordance with an accepted industry technique for checking for stator wedge tightness, a technician strikes the wedge, feels the vibration in the fingers, and listens to the sound. Through experience, technicians have learned to detect the characteristic feel and sound of a loose wedge.

In some generators, the stator wedges have been provided with a series of holes through which a depth micrometer is inserted. The holes are spaced along the wedge so that the difference between the readings on the depth micrometer can be used to calculate the peak to peak deflection of a ripple spring. A low differential indicates a tight wedge, while a differential greater than a selected amount indicates an unacceptably loose stator wedge.

While quite accurate, manually measuring the depth of the ripple spring at each hole is very time consuming. For instance, for a generator having 405 stator slots with three spaced wedges along each slot provided with 7 holes each, 8505 ripple spring readings must be made and recorded.

Both the traditional method in which a technician taps the stator wedges and feels as well as listens to the response to make a judgment on stator wedge tightness, and the above method in which a micrometer is used to measure ripple spring deflection, require removal of the rotor. This in itself can take two or three days. While it would be desirable to be able to use remotely controlled apparatus to check stator wedge tightness without removing the rotor, there is as little as only one and one-half inches between the stator and the rotor retainer ring with the rotor in place through which the test apparatus can be inserted.

U.S. patent application Ser. No. 07/277,472 filed on Nov. 23, 1988 and now Patent No. 4,889,000 discloses apparatus for testing stator wedge tightness which utilizes a low profile remotely controlled carriage on which is mounted a solenoid operated impactor. An on-board television camera is used to position the carriage with the impactor aligned with a wedge. The impactor strikes the wedge and a microphone mounted on the carriage records the resulting vibrations. It has been found that it is difficult to analyze the acoustic response with a computer for automatic testing for wedge tightness.

U.S. Pat. No. 4,803,563 discloses a remotely controlled carriage which is guided along the gap between the rotor and stator of an electric generator while an eddy current tester inspects the condition of the stator insulation. The carriage is held in place against the stator by permanent magnets embedded in the fiberglass chassis of the carriage.

Despite these improvements in inspection apparatus and techniques, there remains a need for improved apparatus for inspecting for generator stator wedge tightness.

There is a particular need for apparatus which can perform such an inspection with the accuracy of the depth micrometer test, but without the need for removal of the rotor.

There is a further need for such apparatus which can accommodate for sizable tolerances in the location of the holes in the stator wedges through which depth measurements must be made.

There is also a need for such apparatus which can compensate for the wide variation in the depth to be measured due to the undulations in the ripple springs.

SUMMARY OF THE INVENTION

These and other needs are satisfied by the invention which includes a low profile carriage insertable in the narrow gap between the rotor and stator and selectively positionable adjacent each hole in the series of holes through the stator wedges. A probe mounted on the low profile carriage is extendable through an aligned hole in the stator wedge and into contact with the ripple spring. Apparatus on the carriage precisely measures the extension of the probe which is successively aligned with the several holes in a stator wedge to determine the degree of compression of the spring.

Preferably, a linear variable differential transformer (LVDT) is used for making the accurate measurement of probe extension. In view of the limited space between the rotor and stator, the LVDT is mounted on the low profile carriage with its longitudinal axis parallel to the plane of the stator wedge. The moveable core of the LVDT is connected to the probe through a cable so that movement of the probe is translated into corresponding movement of the core of the LVDT thereby providing an electrical signal representative of probe extension.

The probe is aligned with a selected hole longitudinally along the stator wedge by movement of the low profile carriage as observed through a television camera mounted on the carriage. Lateral alignment of the probe is achieved by mounting the probe on a platform which is pivotable laterally on a tray which in turn is mounted on the carriage for extension toward and away from the stator wedge. Precise depth measurements are achieved by fixing the distance at which the platform is spaced from the stator wedge. In a preferred embodiment of the invention, this distance is fixed by a gimballed foot carried by the platform.

The probe is extended and retracted by a motor through a lost motion coupling which absorbs movement when the probe seats against a ripple spring. The lost motion coupling includes a pair of cables, one for extending the probe and the other to retract the probe. A first spring in series with the cable which extends the probe absorbs tension applied by the motor when the probe seats against a ripple spring. A second spring connected in series with the other cable takes up slack in the second cable when the probe seats against the ripple spring. These cables and springs are connected in series with the probe and the core of the LVDT. These springs also extend longitudinally in the plane parallel to the plane of the wedge.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
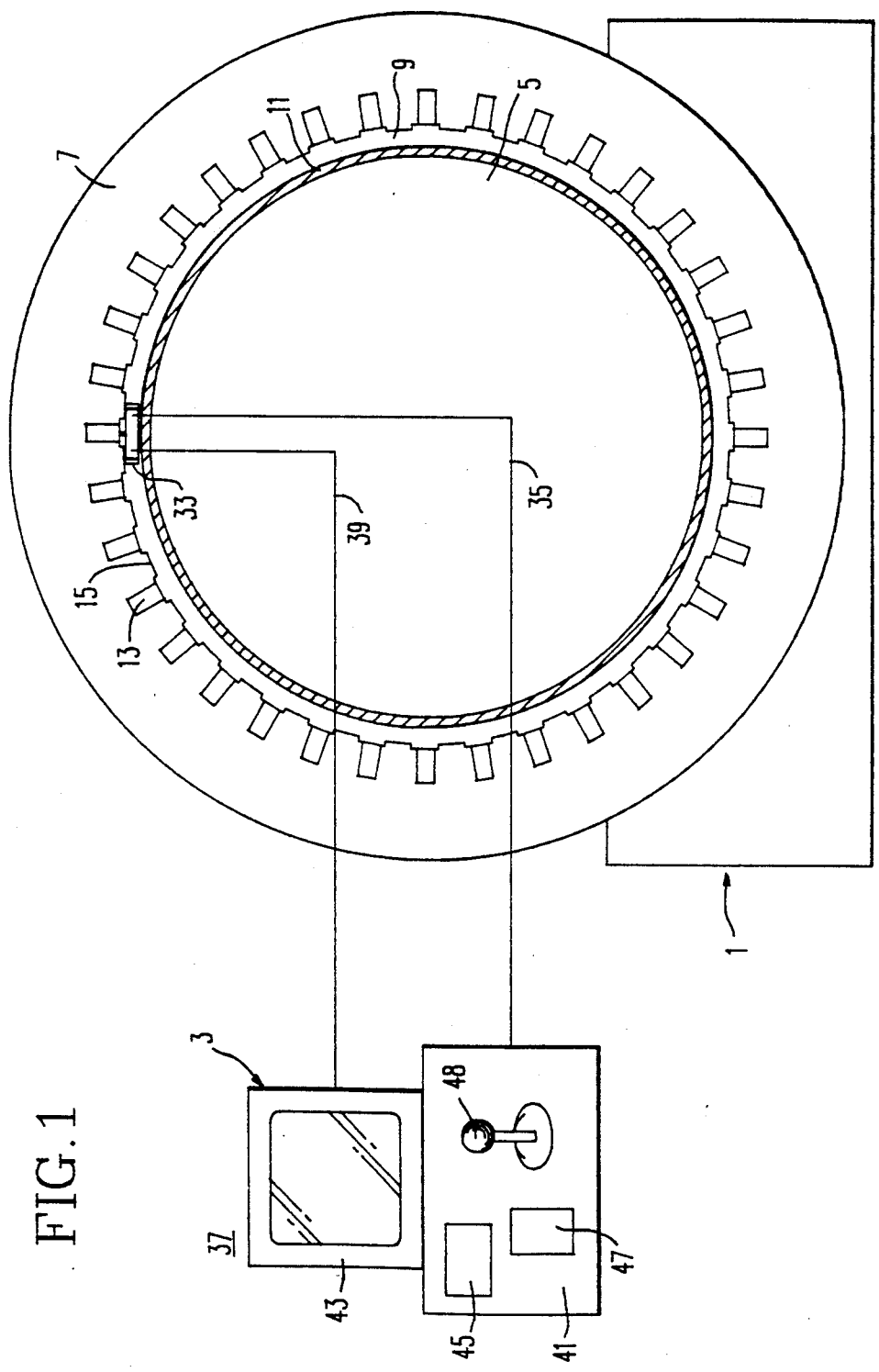
FIG. 1 is a schematic view of an electric generator with the inspection system of the invention in place to perform an inspection of generator stator wedge tightness.

FIG. 1 illustrates schematically a large steam turbine driven electric power generator 1 with the inspection system 3 of the invention in place for measuring generator stator wedge tightness. The generator 1 includes a rotor 5 mounted for rotation within a stator 7. A narrow gap 9 (shown exaggerated in FIG. 1 for clarity) is formed between the rotor retainer ring 11 and the stator 7. In some electric generators, this gape 9 can be as narrow as one and half inches. The stator 7 includes stator coils 13 positioned between longitudinally extending stator teeth 15.

Figure 2:
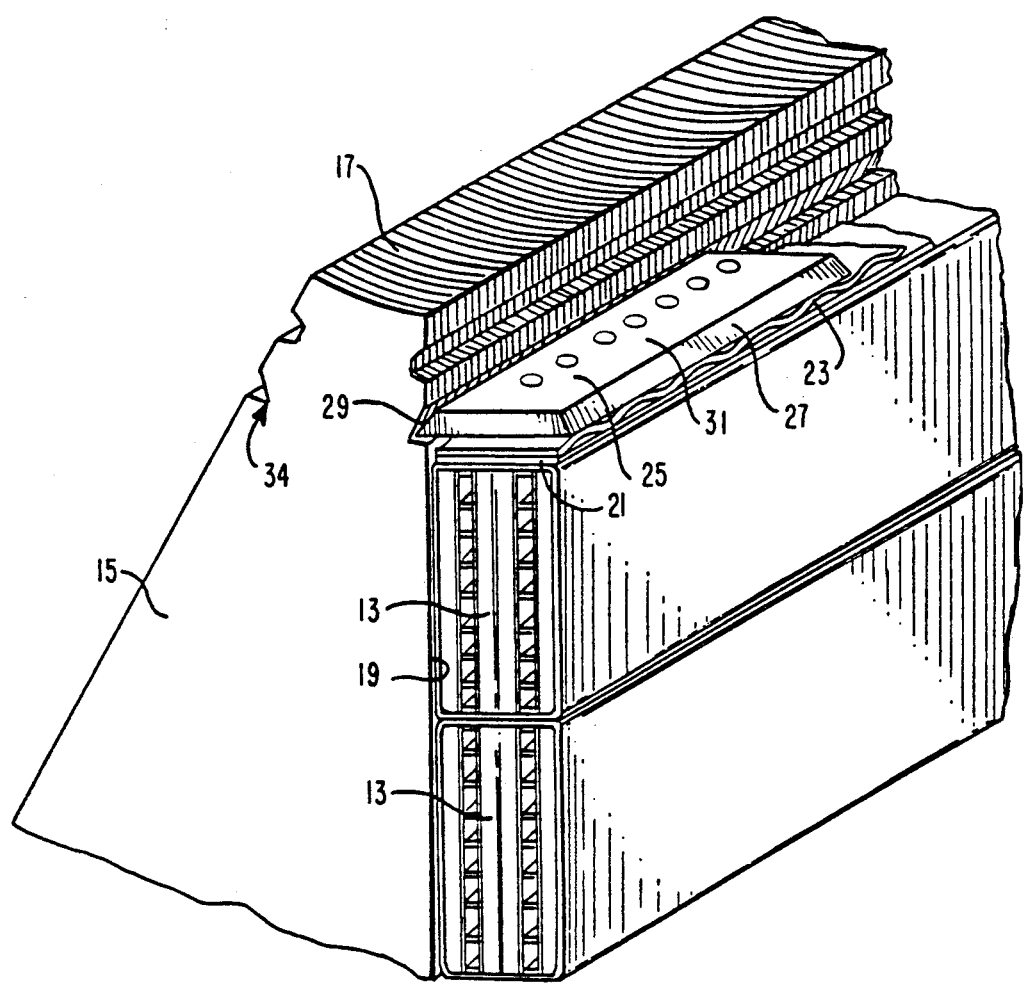
FIG. 2 is a fragmentary isometric view of a portion of the stator of the electric generator of FIG. 1 illustrating the manner in which the stator coil is held in place.

As shown more clearly in FIG. 2, the stator teeth 15 which are made of laminations 17 form stator slots 19 in which stator coils 13 are stacked in pairs, one on top of the other. The stator coils 13 are retained in the slots 19 by shims 21, sections of ripple springs 23 and stator wedges 25 having beveled edges 27 which engage correspondingly shaped grooves 29 in the sidewalls of the stator teeth 15. The ripple spring sections 23 are compressed between the stator wedges and shims 21 to generate a force which firmly holds the coils in place. Over time, the ripple springs can lose their resiliency so that the wedges become loose. As previously mentioned, this permits the coils 13 to vibrate which can result in damage to the coil and eventual failure of the coil insulation. The present invention inspects stator wedge tightness so that corrective action can be taken before this occurs. For this purpose, the stator wedges 25 are provided with a series of longitudinally spaced holes 31 through which a probe, to be described, is inserted.

Returning to FIG. 1, the inspection system 3 of the invention includes a low profile carriage 33 which is inserted in the narrow gap 9 between the rotor and stator and travels along the stator slot inspecting the wedges for tightness. As will be seen, the low profile carriage 33 carries a probe which is extended into each of the holes 31 in the stator wedges 25 to measure the deflection of the ripple spring 23. The low profile carriage 33 also carries a miniature television camera which the operator can use to successively position the probe over each of the holes 31 in the stator wedges, and by which he can monitor operation of the probe. Electrical signals to and from the low profile main carriage to control positioning of the carriage and operation of the probe, and data signals representing the position of the probe are carried by an electrical cable 35 connected between the low profile carriage 33 and a console 37. Similarly, control and video signals to and from the video camera are carried between the main carriage and the console by cable 39. The cable 35 is connected to an electronic control box 41 while the cable 39 carrying the video signals is connected to a monitor 43. The electronic control box 41 includes a display 45 and a keypad 47 through which the operator can interface with and control the inspection system. The monitor 43 permits the operator to position the probe over a selected hole in a stator wedge and to observe operation of the probe using a "joy stick" 48.

Referring especially to FIGS. 3 through 9, the low profile carriage 33 has a chassis 49 made of a non-electrically conductive, non-magnetically permeable material such as fiberglass. Rotatably mounted along each side of the chassis 49 are three wheels 51. The rear wheels 51 are mounted on an axle 53 which is driven through a chain 55 and sprockets 57 and 59 by an electric motor 61 mounted on the chassis 49. Chains 63 engage sprockets 65 to drive all the drive wheels 51 with the motor 61. Operation of the motor 61 causes the low profile carriage 33 to move longitudinally along the stator slot. An encoder 67 driven through a timing belt 68 by an idler wheel 69 generates a signal indicative of movement of the carriage for use in determining the position of the carriage along the stator slot.

Figure 3:
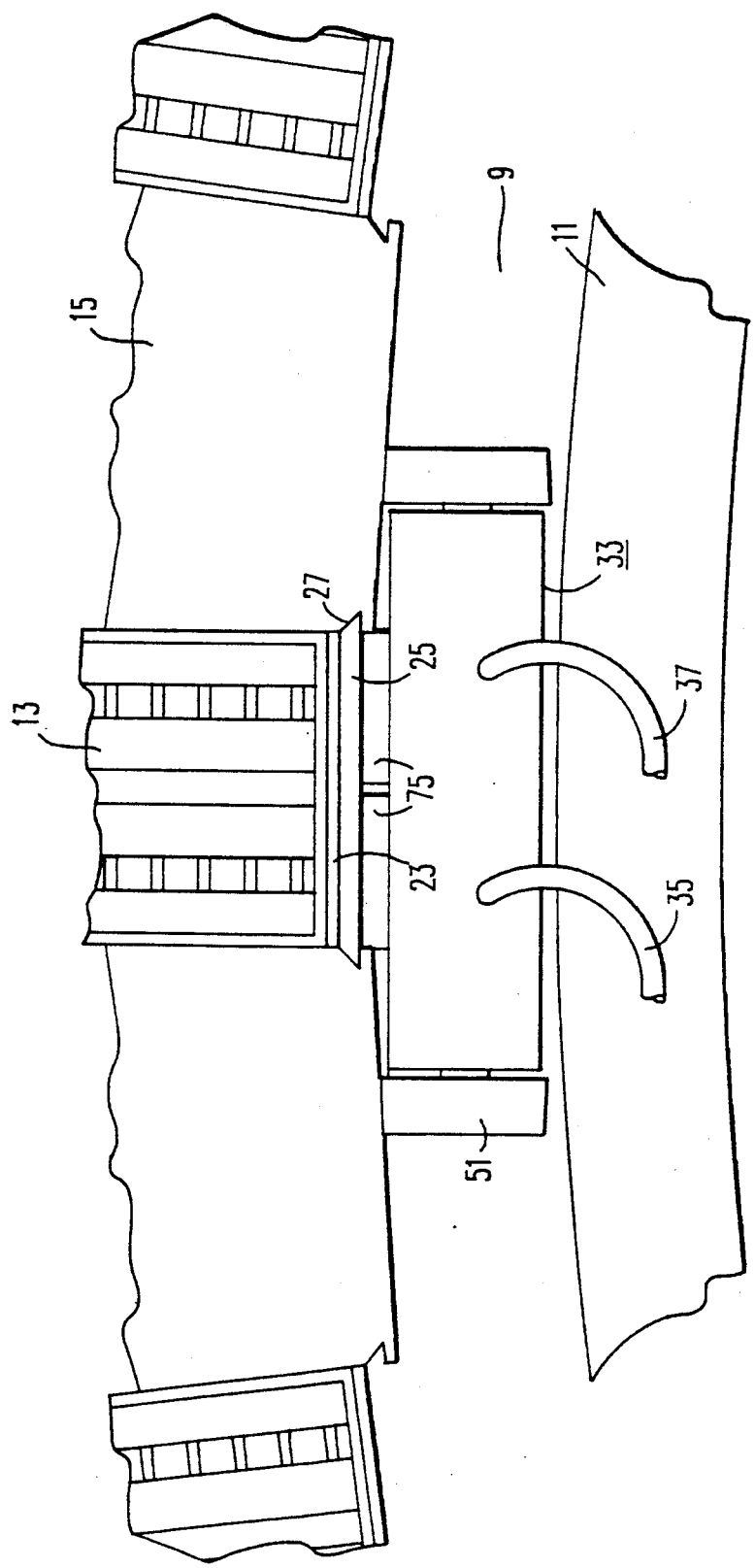
FIG. 3 is a rear view of a low profile carriage of the inspection system of the invention shown in place within the electric generator of FIG. 1.
Figure 4:
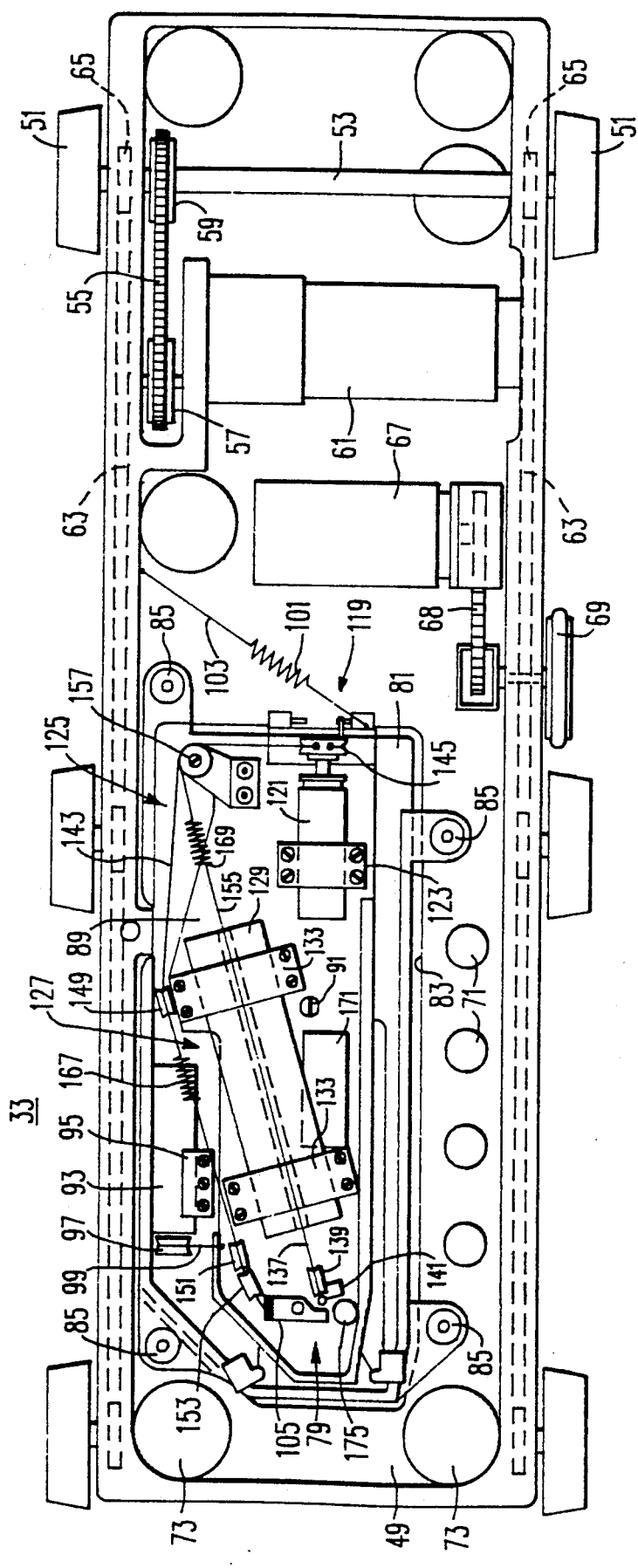
FIG. 4 is a top plan view of the low profile carriage of the inspection system of the invention with the top cover removed.
Figure 5:
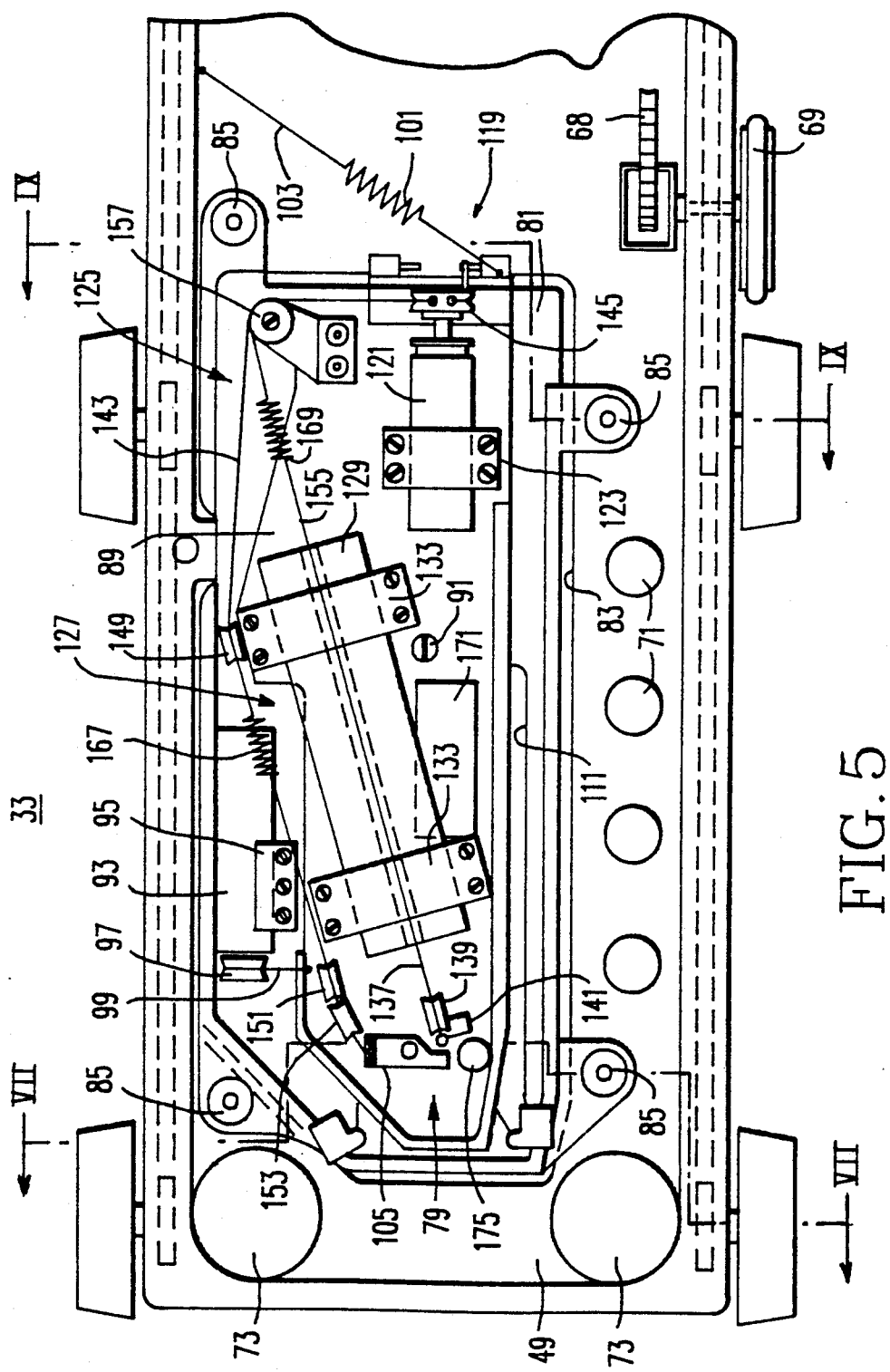
FIG. 5 is a portion of the low profile carriage of FIG. 4 shown in enlarge scale.

A number of one half inch diameter and one inch diameter neodymium magnets 71 and 73, respectively, are distributed over the chassis 49. These magnets secure the carriage 33 to the stator for all locations of the stator slots around the interior of the stator. Guides 75 mounted on the bottom of the chassis 49 engage the stator slot 19 as seen in FIG. 3 to direct the main carriage along a selected slot. As described to this point, the low profile carriage is similar to that described in U.S. Pat. No. 4,803,563.

The low profile carriage 33 carries a probe 77 which is mounted for extension through the holes 31 in the stator wedges 25 to measure the deflection of the ripple springs 23. The mounting 79 for the probe 77 includes a tray 81 which is itself mounted for extension and retraction through an opening 83 in the chassis 49 by four linear bearing mounts 85. An apparatus for providing lateral movement for the probe 77 to laterally align it with the holes 31 includes a platform 89 which is pivotally mounted on the tray 81 by pivot bearing 91. The platform 89 is rotated in a clockwise direction about the pivot bearing 91 by an electric motor 93 secured to the tray 81 by bracket 95. The motor 93 rotates a pulley 97 which reels in a cable 99 attached to the platform. The platform is rotated in the counterclockwise direction by a tension spring 101 connected to the chassis 49 and to the platform through a cable 103.

Figure 8:
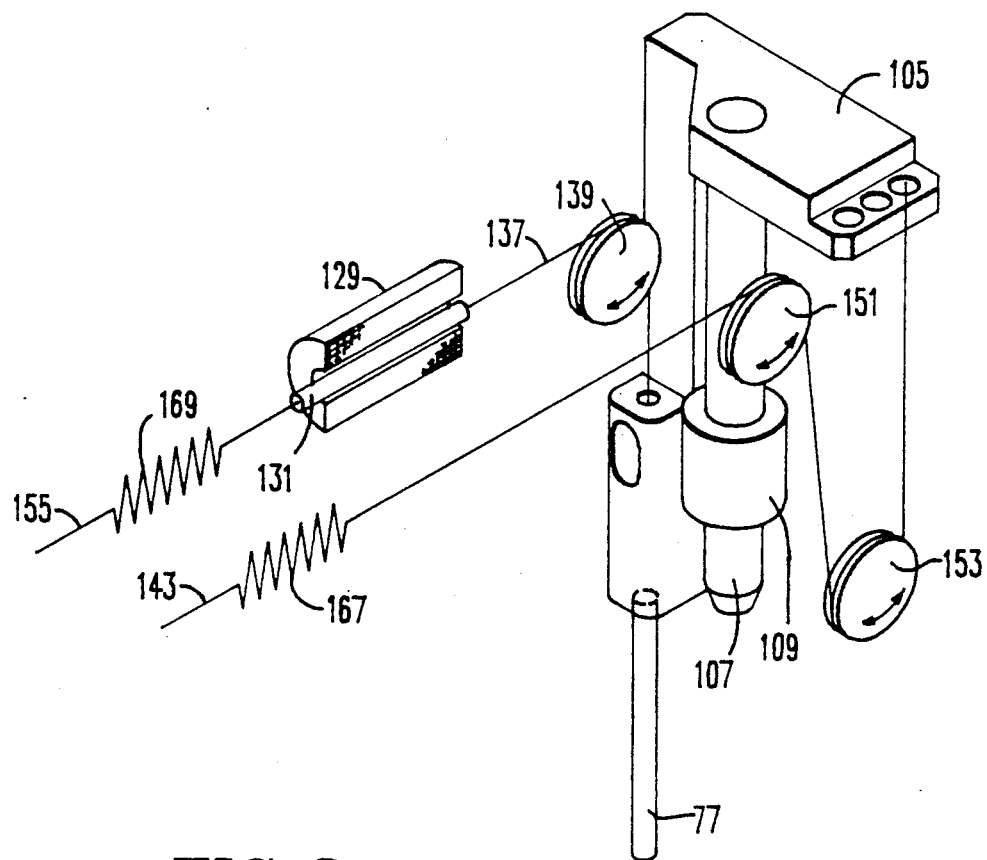
FIG. 8 is a schematic isometric view illustrating the arrangement in which the probe is extended and retracted.
Figure 9:
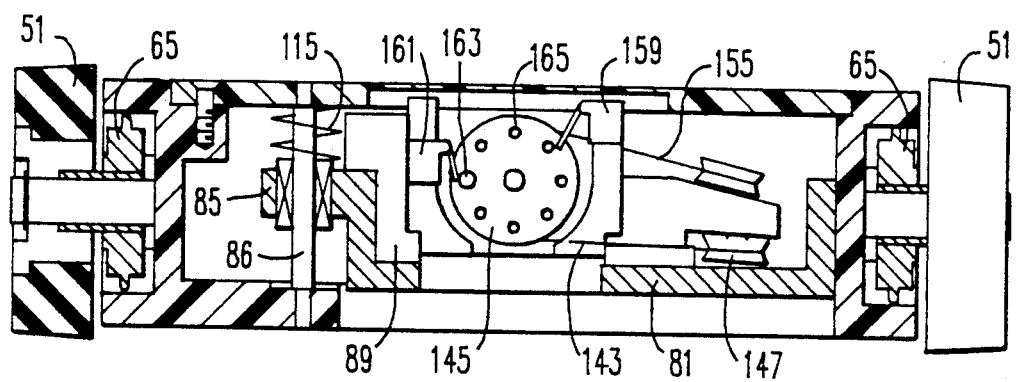
FIG. 9 is a vertical section through the low profile carriage taken along the line IX—IX as shown in FIG. 5.

The probe 77 is inserted in a probe support 105 shown in FIG. 8. This support 105 includes a depending shaft 107 which rides in a linear bearing 109 mounted on the platform. The probe 77 is made of a non-conductive, non-magnetic material, such as for example, nylon, so that if the probe should inadvertently be broken off, it will not cause a short circuit or otherwise interfere with the operation of the generator. The probe 77 and its support 105 extend through an opening 111 in the tray 81 toward the stator wedge (see FIG. 7).

The retracted probe 77 is set to a fixed reference distance from the stator wedge by a gimballed foot 113 which depends from the platform 89. The gimballed foot is biased against the stator wedge by four compression springs 115 (see FIG. 7) mounted coaxially on the tray mounting shafts 86 which bear against the cover plate 117 in the tray 81 which carries the platform 89. The gimballed foot 113 accommodates for any slight misalignment of the stator wedge in fixing the reference position of the probe 77.

A mechanism 119 for extending and retracting the probe 77 from the reference position includes a motor 121 mounted by a bracket 123 on the platform 89, and connected to the probe support 105 through a lost motion coupling 125. A device 127 to precisely measure extension of the probe 77 includes a linear variable differential transformer (LVDT) 129. The LVDT 129 has a moveable core 131. As is well known in such devices, the longitudinal position of the core can be accurately determined by an electrical signal generated by the LVDT. Due to the limited space available in the gap 9 between the rotor and stator, the LVDT is mounted by brackets 133 on the platform 89 with its longitudinal axis parallel to a plane 135 defined by the top surface of the stator wedges. Extension of the probe transverse to this plane 135 is translated into movement of the core 131 of the LVDT 129 by a cable 137 connected to the core 131 and the probe support 105 and reeved over a pulley 139 mounted on a pulley bracket 141 on the platform. The lost motion coupling 125 which connects the motor 121 to the probe support 105 includes a first cable 143 which is wound on a windlass pulley 145. The cable 143 is reeved around pulleys 147 (FIG. 9) and 149 (FIG. 5), over upper pulley 151 and under lower pulley 153 and is then secured to the probe support 105 as best seen in FIG. 8. A second cable 155 wound on the windlass pulley 145 in the opposite direction is reeved around pulley 157 and connected to the core 131 of the LVDT 129.

Operation of the motor 121 to rotate the windlass pulley 145 in the clockwise direction applies tension to the cable 143 which pulls the probe support 105 downward thereby extending the probe 77. Extension of the probe applies tension to the cable 137 which pulls the core 131 into the LVDT 129 thereby adjusting the output of the LVDT to reflect the changed position of the probe. It also results in taking up slack in the cable 155 which is reeled off of the windlass pulley 145. When the motor 121 is rotated in the opposite direction, the probe is retracted by tension applied to the cable 155.

The probe 77 must be extendable to the lowest point in the undulations of the loosest stator wedge, although most readings will not require full extension. Hence, the windlass pulley 145 must be rotated sufficiently to assure this full extension. The limits of rotation of the windlass pulley 145 are set by a down limit switch 159 and an up limit switch 161 which are actuated by a pin 163 which may be inserted in selected holes 165 in the face of the windlass pulley 145.

In order to accommodate for measurements where the probe 77 seats against a portion of a ripple spring before full rotation of windlass pulley 145, the lost motion coupling 125 includes a first spring 167 in the cable 143 and a second spring 169 in the cable 155.

Normally the springs 167 and 169 are extended under tension. When the probe 77 contacts a portion of a ripple spring 23 before full extension, the spring 167 absorbs the lost motion. At the same time, the spring 169 takes up the slack in the cable 155. The spring 167 is stronger than the spring 169 to overcome any friction that may be encountered and inserting the probe through the hole 31 in the stator wedges 25.

Figure 6:
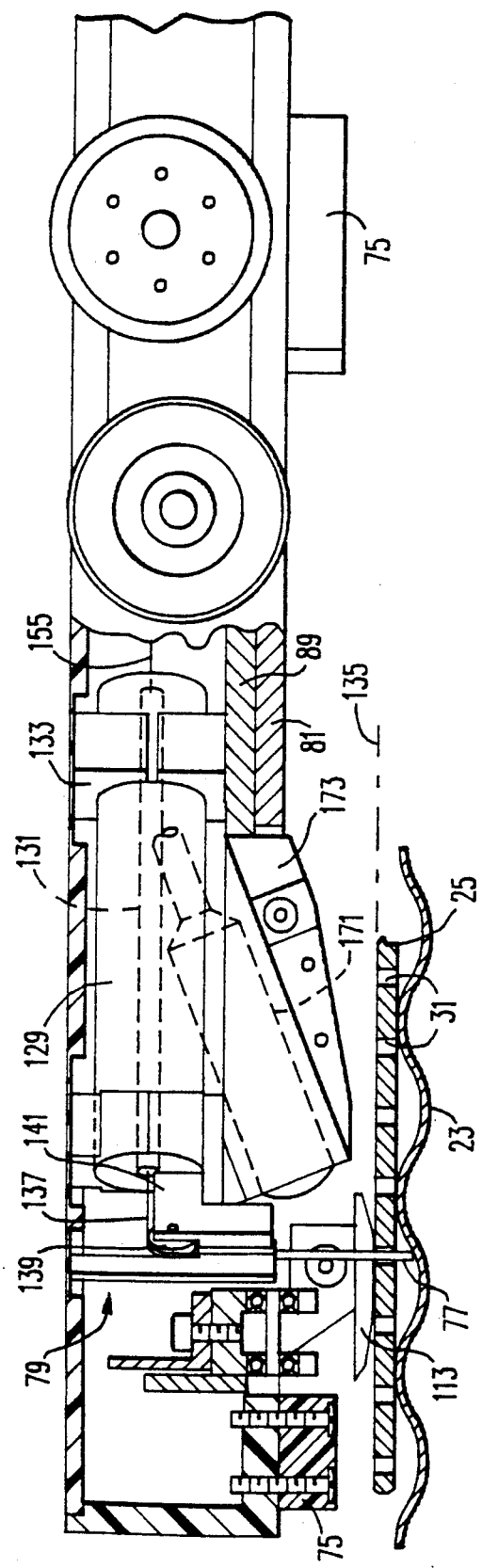
FIG. 6 is a side view partially in section of the portion of the low profile carriage illustrated in FIG. 5 and showing the manner in which ripple spring deflection is measured in accordance with the invention.
Figure 7:
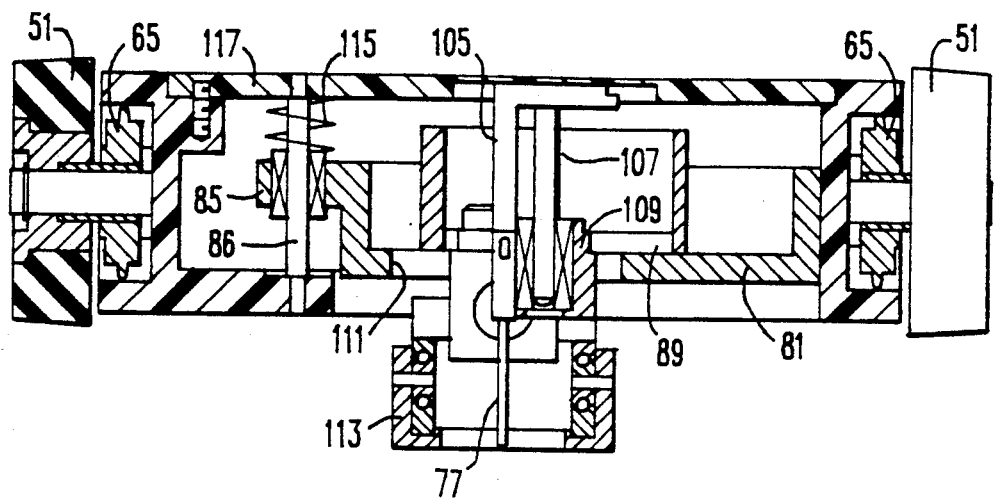
FIG. 7 is a vertical transverse section through a portion of the low profile carriage taken generally along the line VII—VII in FIG. 5.

In measuring ripple spring deflection, the operation drives the low profile carriage 33 along the stator slot 19 to align the probe 77 longitudinally with a hole 31. To aid in this alignment, a miniature television camera 171 is mounted in a camera bracket 173 secured to the platform 89 at an angle which allows the operator to view both the probe and the holes in the stator wedge. A light 175 mounted on the pulley bracket 141 allows the operator to make this observation. Due to tolerances in the drilling of the holes 31 in the statorwedges 25, the probe may not be laterally aligned with the hole. In this instance, the motor 93 is operated to rotate the platform to bring the probe into lateral alignment with the hole. The springs 115 bias the tray and platform, and therefore the gimballed foot 113 against the stator wedge to provide the fixed reference for measuring extension of the probe 77. Once the probe is aligned with a selected stator wedge hole 31, the motor 121 is operated to rotate the windlass pulley 145 in the clockwise direction as viewed in FIG. 9 to extend the probe into the hole. This results in pulling the core 131 partially out of the LVDT 129 a corresponding distance to provide an electrical measurement of the extension. When the probe 77 seats against the ripple spring as shown in FIG. 6, continued rotation of the windlass pulley 145 results in extension of the spring 167 to take up the lost motion and contraction of the spring 169 to take up the slack in the cable 155. When the extension has been recorded, the motor 121 is operated to rotate the windlass pulley 145 in the counterclockwise direction to withdraw the probe 77 to the position shown in in FIG. 7. The gimballed foot 113 remains biased against the wedges as the carriage is advanced along the stator slot to the next hole. Measurement of the ripple spring deflection is not dependent upon the orientation of the low profile carriage, and accurate measurements are made through all 360 degrees around the stator.

The present invention provides a highly accurate means for measuring deflection of stator ripple springs for determining stator wedge tightness without requiring removal of the rotor.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for measuring the tightness of stator wedges held in place by ripple springs in an electric generator having a rotor and a stator separated by a narrow radial gap without removing the rotor, where selected of said stator wedges have a series of longitudinally spaced holes through which the ripple springs are accessible, said apparatus comprising:

a low profile carriage insertable in said narrow gap between the rotor and stator and successively positionable adjacent each hole in said series of holes through said selected stator wedges;

a probe;

probe mounting means mounting said probe on said low profile carriage and selectively extending said probe through an adjacent hole in said selected wedges and into contact with said ripple springs; and means measuring the extension of said probe.

2. The apparatus of claim 1 wherein said probe is non-electrically conducting and non-magnetically permeable.

3. The apparatus of claim 1 wherein said means measuring extension of said probe includes:

a linear variable differential transformer having a movable core; and means connecting said movable core to said probe for movement therewith.

4. The apparatus of claim 3 wherein said adjacent wedge defines a plane, wherein said probe mounting means comprises means mounting said probe for extension substantially perpendicular to said plane defined by said adjacent wedge, wherein said linear variable differential transformer is mounted with its movable core movable in a direction substantially parallel to said plane defined by said adjacent wedge and wherein said connecting means translates extension of said probe substantially perpendicular to the plane defined by said adjacent wedge into corresponding movement of said movable core of the linear variable differential transformer substantially parallel to the plane defined by said adjacent wedge.

5. The apparatus of claim 1 wherein said probe mounting means includes:

a tray mounted on said carriage for movement generally toward and away from an adjacent stator wedge;

means extending said tray toward said adjacent wedge;

reference setting means setting the distance between said tray and the adjacent wedge to a preselected reference distance; and means mounting said probe on said tray.

6. The apparatus of claim 5 wherein said reference setting means comprises a gimballed foot carried by said tray.

7. The apparatus of claim 5 wherein said means mounting said probe on said tray includes a platform, and means mounting said platform for lateral movement of said probe relative to said tray.

8. The apparatus of claim 7 wherein said means mounting said platform for lateral movement of said probe comprises a pivot mount on said tray, and means pivoting said platform about said pivot mount to displace said probe laterally.

9. The apparatus of claim 1 wherein said probe mounting means includes means setting a reference distance between said probe and a selected wedge.

10. The apparatus of claim 9 wherein said probe mounting means includes means laterally displacing said probe to align the probe with said holes in said selected wedge.

11. The apparatus of claim 1 including camera means for generating a remote visual display of said probe and said adjacent hole in a stator wedge.

12. The apparatus of claim 1 wherein said probe mounting means selectively extending said probe includes;

motive means operative to extend said probe from a fully retracted position to a fully extended position; and lost motion coupling means coupling said motive means to said probe and operative to absorb movement of said motive means when said probe seats against a ripple spring before reaching said fully extended position.

13. The apparatus of claim 12 wherein said lost motion coupling means comprises;

a pair of cables, one connected to extend said probe when tension is applied thereto by said motive means and the other connected to retract said probe when tension is applied thereto by said motive means;

a first spring connected in series with said one cable absorbing tension applied by said motive means when said probe seats against a ripple spring before reaching said fully extended position; and a second spring connected in series with said other cable taking up slack in said other cable when said probe seats against a ripple spring before reaching said fully extended position.

14. The apparatus of claim 13 wherein said first spring generates a force which exceeds a force generated by said second spring as said motive means is operated to extend said probe such that said probe overcomes any friction force produced by any contact of said probe with said wedge as said probe is extended through a hole in said wedge.

15. The apparatus of claim 14 wherein said probe mounting means mounts the probe for extension substantially perpendicular to a plane defined by said adjacent wedge and wherein said first and second springs extend longitudinally in a plane substantially parallel to the plane defined by said wedge.

16. The apparatus of claim 15 wherein said means measuring extension of said probe includes a linear variable differential transformer having a movable core movable in a direction substantially parallel to said plane defined by said adjacent wedge, and connecting means connecting said movable core to said probe and translating extension of said probe substantially perpendicular to said plane defined by said wedge into movement of said movable core in said direction substantially parallel to the plane defined by said adjacent wedge.

17. The apparatus of claim 16 wherein said other cable and said second spring are connected in series with said movable core of the linear variable differential transformer and said connecting means.

18. Apparatus for measuring the tightness of stator wedges held in place by ripple springs in an electric generator having a rotor and stator separated by a narrow radial gap without removing the rotor where selected of said stator wedges have a series of longitudinally spaced holes through which the ripple springs are accessible, said apparatus comprising:

a low profile carriage insertable in said narrow radial gap between the rotor and stator and successively positionable adjacent each hole in said series of holes through said selected stator wedges;

a tray mounted on said low profile carriage for movement generally toward and away from an adjacent stator wedge;

reference setting means setting the distance between said tray and the adjacent stator wedge to a preselected reference distance;

a platform;

means mounting the platform on said tray for movement with said tray to said preselected reference distance between the tray and the adjacent stator wedge, and for movement laterally with respect to said tray;

a probe;

probe mounting means mounting said probe on said platform and selectively extending said probe through an adjacent hole in said selected stator wedges and into contact with said ripple springs; and measuring means measuring the extension of said probe when in contact with said ripple springs.

19. The apparatus of claim 18 wherein said probe mounting means selectively extending said probe includes:

motive means operative to extend said probe from a fully retracted position to a fully extended position; and lost motion coupling means coupling said motive means to said probe means mounting and operative to absorb movement of said motive means when said probe seats against a ripple spring before reaching said fully extended position.

20. The apparatus of claim 19 wherein said lost motion coupling means includes:

a pair of cables, one connected to extend said probe when tension is applied thereto by said motive means and the other connected to retract said probe when tension is applied thereto by said motive means;

a first spring connected in series with said one cable which absorbs tension applied by said motive means when said probe seats against a ripple spring before reaching said fully extended position; and a second spring connected in series with said other cable taking up slack in said other cable when said probe seats against a ripple spring before reaching said fully extended position, said first spring generating a force which exceeds a force generated by said second spring as said motive means is operated to extend said probe.

21. The apparatus of claim 20 wherein said measuring means includes:

a linear variable differential transformer having a movable core movable in a direction substantially parallel to a plane defined by an adjacent stator wedge; and connecting means translating movement of said probe into movement of said movable core, and wherein said movable core and connecting means are connected in series with said pair of cables, said first and second springs, said probe, and said motive means.

22. The apparatus of claim 21 including camera means generating a remote display of said probe and said adjacent hole in a selected one of said stator wedges.

* * * * *